United States Patent [19]

Yano

[11] Patent Number: 4,516,272
[45] Date of Patent: May 7, 1985

[54] COMMUNICATION NETWORK

[75] Inventor: Takashi Yano, Tokyo, Japan

[73] Assignee: Ricoh Company, Ltd., Japan

[21] Appl. No.: 466,504

[22] Filed: Feb. 15, 1983

[30] Foreign Application Priority Data

Feb. 15, 1982 [JP] Japan ................................. 57-21312

[51] Int. Cl.³ .............................................. H04B 9/00
[52] U.S. Cl. ..................................... 455/607; 370/58;
370/60; 455/612
[58] Field of Search ............... 455/600, 607, 612, 601;
370/58, 60, 53; 358/181

[56] References Cited

U.S. PATENT DOCUMENTS 4,090,067 5/1978 Bell ....................... 455/612

FOREIGN PATENT DOCUMENTS 56-84096 7/1981 Japan .................................... 370/53

OTHER PUBLICATIONS

Gfeller et al.,-"Local Area Fiber-Optic"-vol. 22-No. 8B, Jan., 1980, pp. 3815, 3816-IBM Tech Disclosure Bull.
McDermid et al.,-"Design and Use of Comflex"-IEE Proc-vol. 127, PTE No. 6, Nov. 1980, pp. 233-240.
Burnell et al.,-"Microprocessor Utilization"-IEEE Trans on Computers, vol. C-29, No. 2, Feb. 1980, pp. 206-208.

Primary Examiner—Joseph A. Orsino, Jr.
Attorney, Agent, or Firm—Guy W. Shoup

[57] ABSTRACT

A communication network includes a plurality of nodes which are connected by transmission lines, preferably of optical fibers. One or more terminals such as general purpose computers are connected to selected ones of the nodes also via the transmission lines. Each of the nodes comprises a plurality of input channels, a like plurality of output channels and a connection controller for controlling the connecting condition between the input and output channels. Each of the input channels is paired with one of the output channels. The input and output channels of one pair of a first node are connected through the transmission lines to the output and input channels, respectively, of one pair of a second node or a first terminal, and the input and output channels of another pair of the first node are connected through the transmission lines to the output and input channels, respectively, of one pair of a third node or a second terminal.

19 Claims, 12 Drawing Figures

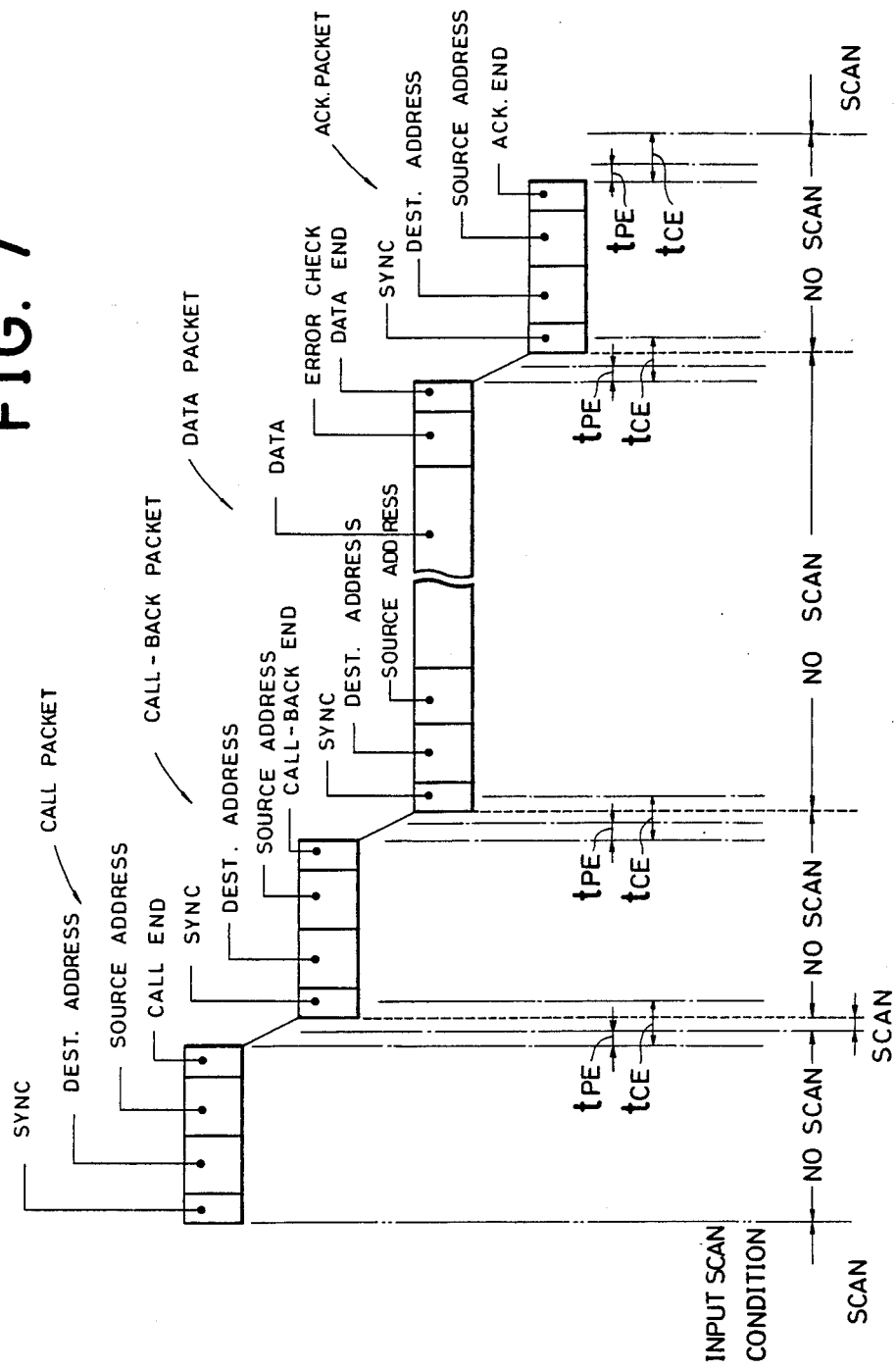

COMMUNICATION NETWORK

BACKGROUND OF THE INVENTION

1. Field of the Invention

This invention generally relates to a communication network, and, in particular, to such a communication network in which a plurality of terminals, located remotely from one another, are connected through nodes and transmission lines and the connecting conditions among the transmission lines at the nodes are controlled to carry out a desired communication between arbitrarily selected source and destination terminals.

2. Description of the Prior Art

Heretofore, several proposals have been made as to a communication network which is formed by connecting a plurality of terminals, such as general purpose computers, exclusive purpose computers, memory devices, terminal controllers and printers, which are remotely spaced apart from one another through nodes and transmission lines, whereby communication may be carried out between arbitrarily selected source and destination terminals. For example, the coaxial bus structure as disclosed in a literature by R. M. Metcalfe and David R. Boggs, entitled "Ethernet: Distributed packet switching for local networks", CACM, Vol. 19, No. 7, July 1976, 395–404 pages, and the loop structure as disclosed in a literature by D. J. Farber, entitled "A Ring Network", Datamation, Vol. 21, No. 2, February 1975, 44–46 pages, are well known. Theses coaxial bus and loop structures are shown in FIGS. 1 and 2, respectively.

In the coaxial bus structure shown in FIG. 1, a plurality of terminals $3a-3e$ are connected to corresponding coaxial cables $1a$, $1b$ and $1c$ via taps or T-connectors 2. As shown, provided as interposed between any one of the terminals $3a-3e$ and the corresponding tap 2 is an appropriate device 4, such as an input/output buffer, an input/output interface and transceiver, which is determined in accordance with the kind of the associated terminal. A terminator 5 is provided at each end of any of the coaxial cables $1a-1c$, and the terminator 5 carries out impedance matching at the cable end so as to prevent the reflection of a signal from occurring. A coupling between two different coaxial cables is made via a repeater 6. In such a prior art coaxial bus structure, the network may be easily expanded by simply providing additional repeaters 6 and coaxial cables 1, and one or more of local terminals 3 may be easily removed without adversely affecting the overall performance of the network. However, since this network is, in essence, constructed by interconnecting separate coaxial cables 1 using repeaters 6, its reliability in operation as well as speed of operation cannot be expected to be very high.

For example, in the structure shown in FIG. 1, when the repeater $6b$ malfunctions, it is impossible to carry out communication between the terminal $3c$ and either one of the terminals $3d$ and $3e$. In order to avoid such a situation, an additional repeater may be provided; however, this then causes the entire system to become larger in size and more complex in structure, and thus this approach is not advantageous. Moreover, since communication between those terminals which are connected to different coaxial cables, e.g., between the terminals $3a$ and $3c$, or $3b$ and $3d$, is necessarily carried out through the associated repeater $6a$ and the function of the repeater 6 is to match signals between the coaxial cables connected thereto, the communication speed depends upon the performance of the repeater. In addition, it is true that the communication speed of the coaxial bus structure shown in FIG. 1 may be increased by using optical fibers as transmission lines; however, since high impedance fiber optic T-connectors are not available at present, technological difficulties will be encountered if an attempt is made to use optical fibers in the Ethernet structure of FIG. 1.

On the other hand, in the loop structure shown in FIG. 2, a plurality of nodes 8 and a supervisor 9 are provided as connected to a loop-shaped transmission line 7, and individual terminals 3 are connected to the corresponding nodes 8 or the supervisor 9. In such a loop structure, use may be made of an optical fiber to form the transmission line 7 in order to increase the communication speed; however, the fundamental drawback of the loop structure is a lack of reliability. Stated in detail, in the loop structure as shown in FIG. 2, because of the fact that a plurality of nodes 8 and the supervisor 9 are serially connected, failure of only one of the nodes and/or a local failure in the transmission line will result in the total system failure. Besides, an expansion of the system is rather limited partly because of the nature of the loop structure, which is essentially a closed system, and partly because of the existence of the supervisor 9, which functions as a central controller of the system.

SUMMARY OF THE INVENTION

It is therefore a primary object of the present invention to obviate the above-described disadvantages of the prior art and to provide a communication network system high in performance, transmission speed as well as reliability. The communication network of the present invention may be expanded or reduced in size extremely easily. More importantly, light transmitting mediums such as optical fibers may be easily applied as the transmission lines of the present communication network, and, thus, the data transmission rate may be increased to the level of 10 to 100 mega bps. When use is made of light transmitting mediums such as optical fibers instead of metal conductors such as coaxial cables for the transmission lines, one can obtain advantages which are unique in light signal processing. These advantages include immunity from electromagnetic interactions, absence of radiation of electromagnetic waves, immunity from a grounded circuit, a broader bandwidth and a lower cost.

In accordance with one aspect of the present invention, there is provided a communication network comprising an appropriate number of nodes, each of said nodes including at least two input channels, the same number of output channels each corresponding to each of said input channels and connection control means for controlling the connection condition between said input and output channels; transmission means connecting between said nodes; and an appropriate number of terminals connected to selected ones of said nodes, whereby, a first input channel of said at least two input channels and its corresponding first output channel of a first node are connected through said transmission means to a first output channel and its corresponding first input channel, respectively, of a second node or a first terminal and a second input channel of said at least two input channels and its corresponding second output channel of said first node are connected through said transmission means to a first output channel and its corresponding first input channel, respectively, of a third node or a second output terminal. Stated another way, in accordance with the present invention, when considered functionally, each of the nodes is comprised of three functional sections: an input section including a plurality of input channels; an output section including a plurality of output channels; and a connection control section for controlling the connection condition on communication between the input and output channels, whereby one of the input channels and its corresponding output channel in each of the nodes form a pair and each of the nodes includes two or more such input and output pairs.

Therefore, in accordance with the present invention, a node-to-node connection is made such that a first pair of input and output channels of one of the nodes are connected to a first pair of output and input channels of another of the nodes, respectively, through the transmission lines; moreover, since each of the nodes includes at least two pairs of input and output channels, a second pair of input and output channels of said one of the nodes may be connected to a first pair of output and input channels of a still another of the nodes, respectively, through the transmission lines, thereby forming a network. Furthermore, one or more pairs of input and output channels of selected ones of the nodes are connected to terminals of desired kinds to complete the present communication network, so that communication may be carried out between arbitrarily selected source and destination stations or terminals.

In each of the nodes of the present invention, one of the input channels and one of the output channels form a pair, and, thus, it is so structured that each of the input channels correspond to one of the output channels and paired input and output channels of one node are connected to paired output and input channels of another node, respectively. Of importance, the input channel of a pair of input and output channels of a first node is connected through a transmission line to the output channel of a pair of input and output channels of a second node; on the other hand, the output channel of the pair of input and output channels of the first node is connected through a transmission line to the input channel of the pair of input and output channels of the second node. In this case, the transmission line for interconnection between node to node or node to terminal may be comprised of a pair of transmission lines which are physically separate from each other, or, alternatively, it may be comprised of a bidirectional transmission line which is of the physically unitary structure.

One feature of the present invention resides in that each node of the communication network has a multi-junction structure. That is, each of the nodes includes at least two pairs of input and output channels and each pair of input and output channels of one node is connected to one pair of input and output channels of another node or a terminal in an input to output and output to input relation. It is to be noted that terminals may be provided as connected to selected nodes and it is not necessary to provide one or more terminals for each of the nodes in the network. With this structure, in principle, there exists more than one communication path between a source terminal and a destination terminal, which are selected arbitrarily. However, in accordance with the present invention, due to the adoption of the first-come-first-served logic, the most appropriate communication path is selected for operation, as will be fully described later. This also indicates that even if one or more of nodes or transmission lines have failed, still the most appropriate communication path, which goes around the failed nodes or transmission lines, is automatically selected for operation under the given condition, so that total failure of the system or network is prevented from occurring. It should also be noted that since the node has the multi-junction structure, the communication network may be easily expanded.

Another feature of the present invention resides in that the first-come-first-served logic is applied to the node of the network thereby allowing to automatically select one of the input signals even if more than one input signals are supplied to the node. Stated more in detail, as described previously, in the case where the node of the communication network includes at least two input channels as in the present invention, there is a possibility of occurrence of a collision of signals when two or more signals are supplied at the same time. However, in accordance with the present invention, the input channels of each node are scanned to have them turned on and off sequentially in a cyclic manner, and as soon as an input signal has been supplied to one of the input channels, the scanning is terminated and the other input channels are maintained off, so that only the input signal which has arrived the node in the first place is taken in. Even if two or more input signals have arrived simultaneously at different input channels of the same node, since the input channels are scanned in timed sequence and thus they are turned on for a short period of time one after another, only one of the input signals may be selected as a valid signal.

A further feature of the present invention resides in that the node itself does not have its own address and the intelligence of the node is made as small as possible. That is, the node of the present network only controls the operation of supplying the input signal applied to one of the input channels to which one of the output channels and it does not examine the contents of the input signal, which is typically in the form of a packet signal. The node of the present network includes the connection control section for controlling the connecting condition between the input and output channels, and the connection control section controls the flow of data from a particular input channel to a particular output channel through the node.

In the preferred mode of the present invention, it is so structured that the connection control section of a node normally scans its series of input channels in sequence, and as soon as a first input signal has been supplied to one of the input channels, the scanning operation is terminated and kept inoperative until a predetermined time period has elapsed upon reception of the input signal thereby blocking the following signals transmitted through the other lines from being received by the other input channels, and, at the same time, the information as to which of the input channels have received a valid input signal in the first place is stored. After elapsing a predetermined time period upon completion of reception of the first input signal, the connection control section resumes the scanning operation of the input channels, and, similarly, when a second input signal is supplied to any of the input channels, the connection control section ceases its scanning operation, which is not resumed until a predetermined time period has elapsed upon completion of reception of the second input signal, and, at the same time, allows the second input signal to be output through the output channel corresponding to the input channel, the information of which has been stored. In this manner, when the first signal is transmitted from a source terminal to a destination terminal, the connection control section of each of the nodes located in the path along which the first signal has been transmitted stores the information of a particular input channel to which the first signal has been input for a predetermined time period. The destination terminal then supplies a second signal within the predetermined time period in response to the first signal, and, thus, the second signal may be supplied to the source terminal only through the particular path which has been determined by the transmission of the first signal.

This indicates, as will be more fully described later, that the present communication network is adaptable for space sharing communication, and thus it is possible to carry out the simultaneous data transmission of an identical or a plurality of data from a plurality of source terminals to a plurality of destination terminals. It should also be noted that the node of the present network is transparent as to the contents of a signal because it does not have its own address. Thus, the present network may be expanded or diminished at will, and a node to node connection or a node to terminal connection may be selected without any constraint.

A still further feature of the present invention resides in the applicability to space sharing communication. As described above, since the node has the multi-junction structure, a plurality of possible transmission paths exist between one terminal and another terminal in the present communication network. Moreover, since the communication path is uniquely determined by storing the information, in each node, as to which of the input channels has received a valid signal on the basis of the first-come-first-served logic, the remaining communication paths or lines may be simultaneously used for transmitting the same or different information. This allows to significantly increase the use rate of the communication network.

BRIEF DESCRIPTION OF THE DRAWINGS

FIG. 7 is an illustration showing a set of packet signals which may be used in the communication network including the nodes, having the structure shown in FIG. 6.

DESCRIPTION OF PREFERRED EMBODIMENTS

Now, with reference to the drawings, preferred embodiments of the present invention will be described hereinbelow.

Figure 3:
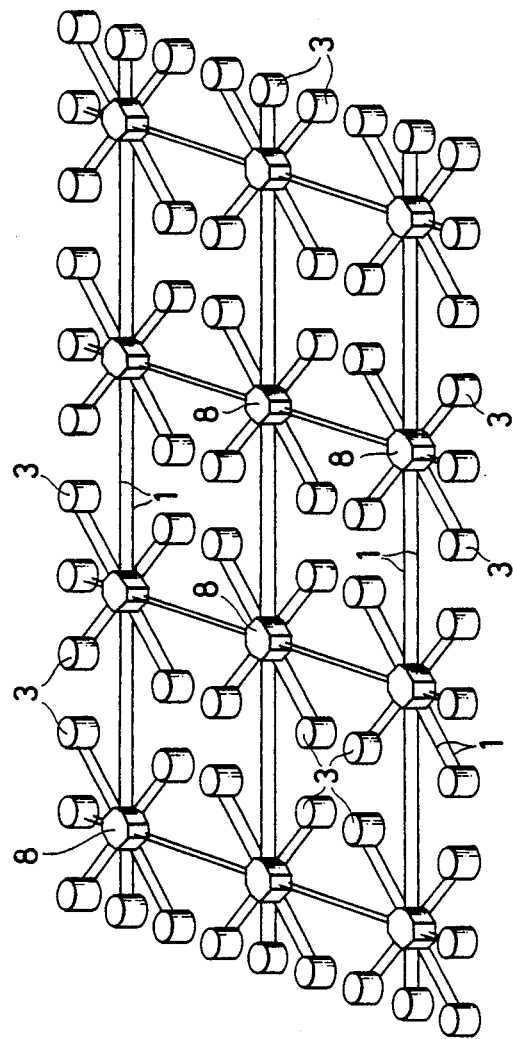
FIG. 3 is a perspective view schematically showing one embodiment of a communication network constructed in accordance with the present invention.

FIG. 3 depicts in perspective one embodiment of the communication network constructed in accordance with the present invention, and it comprises a plurality of nodes 8 arranged in the form of a matrix, terminals 3 each connected to the corresponding nodes 8 and pairs of transmission lines 1, 1 for node to node connection and node to terminal connection. Although a plurality of nodes 8 are arranged in the matrix format in the illustrated example, such a particular arrangement is not essential to the present invention. Moreover, in FIG. 3, four or five terminals 3 are shown to be provided as connected to each of the nodes 8, but this is just an example and any appropriate number of terminals 3 may be provided as connected to each of the nodes 8. On the other hand, no terminals 3 may be provided as connected to some of the nodes 8.

Figure 1:
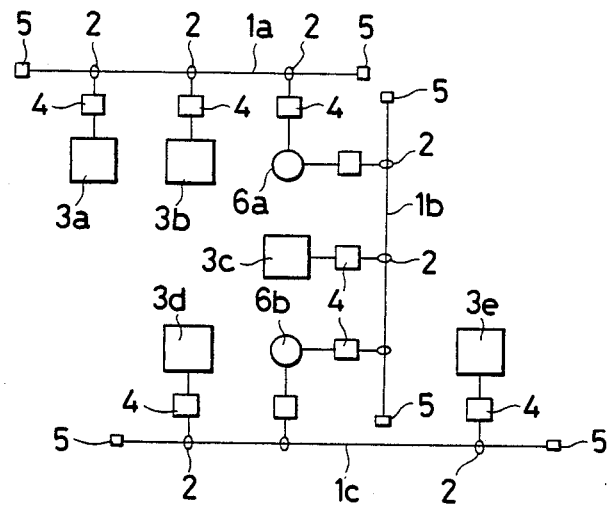
FIG. 1 is a schematic illustration showing the prior art communication network having the coaxial bus structure.
Figure 2:
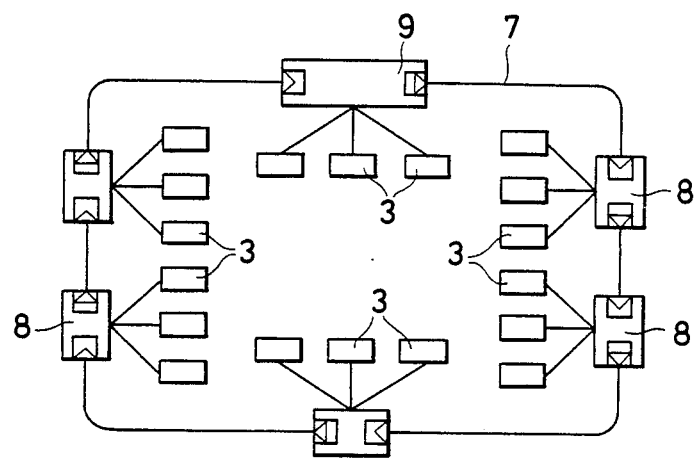
FIG. 2 is a schematic illustration showing the prior art communication network having the loop structure.

In the example shown in FIG. 3, each node 8 includes eight pairs of input/output channels and thus eight pairs of transmission lines 1 are connected to each node 8. In accordance with the present invention, each node 8 is so structured to have at least two pairs of input/output channels; however, as in the illustrated example, the more the number of pairs of input/output channels, the more the number of possible communication paths and thus the more enhanced reliability of the communication network. Incidentally, a node to node connection and a node to terminal connection are not limited to a particular structure, and any of the well known connection structures such as linear, loop and star connection structures is applicable. However, as may be understood from FIG. 3, if the loop connection structure is used as many as possible, the number of possible communication paths from one terminal 3 to another terminal 3 is increased as compared with the other cases, and, thus, the network may be made more reliable. Even in this case, since no central control element such as the supervisor 9 of the prior art loop structure shown in FIG. 2 exists and each node 8 has the multi-junction structure in the present invention, it is easy to form composite loops which are intertwined from each other. With this structure, even if one or more of the nodes 8 fail or one of more of the transmission lines 1 are disconnected, the communication path between arbitrarily selected two points may be defined by going around the failed nodes and transmission lines.

Of importance, paired input and output channels of one node 8 are connected to paired output and input channels of another node 8, respectively, through a pair of transmission lines 1, 1. It is to be noted that a pair of physically separate transmission lines 1, 1 are shown in FIG. 3, but such a pair may be replaced by a single bidirectional transmission line. It should also be noted that using optical fibers as the transmission lines allows to obtain several advantages resulting from the unique properties of the optical fibers as noted previously.

Figure 4:
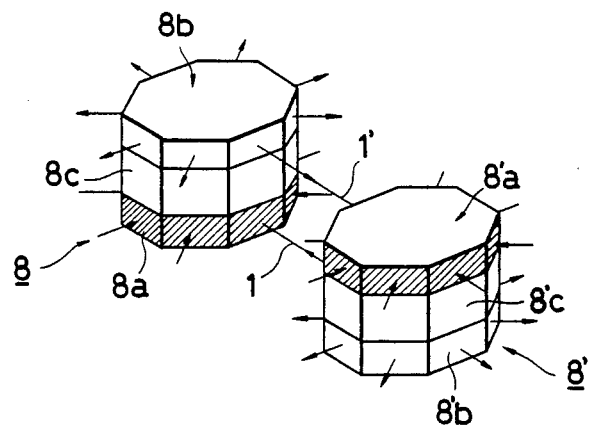
FIG. 4 is a perspective view schematically showing the connection condition between arbitrarily selected two nodes in the network of FIG. 3.
Figure 5:
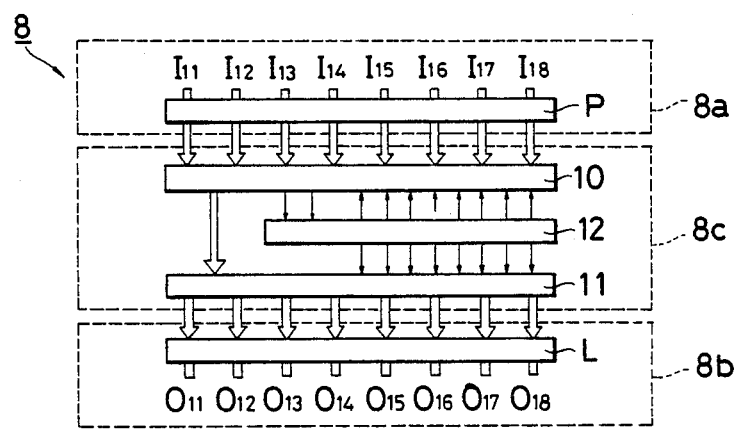
FIG. 5 is a schematic illustration showing one example of the structure of the node 8 of the network in FIG. 3.

FIG. 4 illustrates in perspective on an enlarged scale a pair of nodes 8 and 8' which are interconnected by a pair of transmission lines 1, 1. As shown, each of the nodes 8 and 8' is comprised of three sections: an input section 8a (8a'), an output section 8b (8b') and an input/output connection control section 8c (8c') for controlling the connection condition between the input and

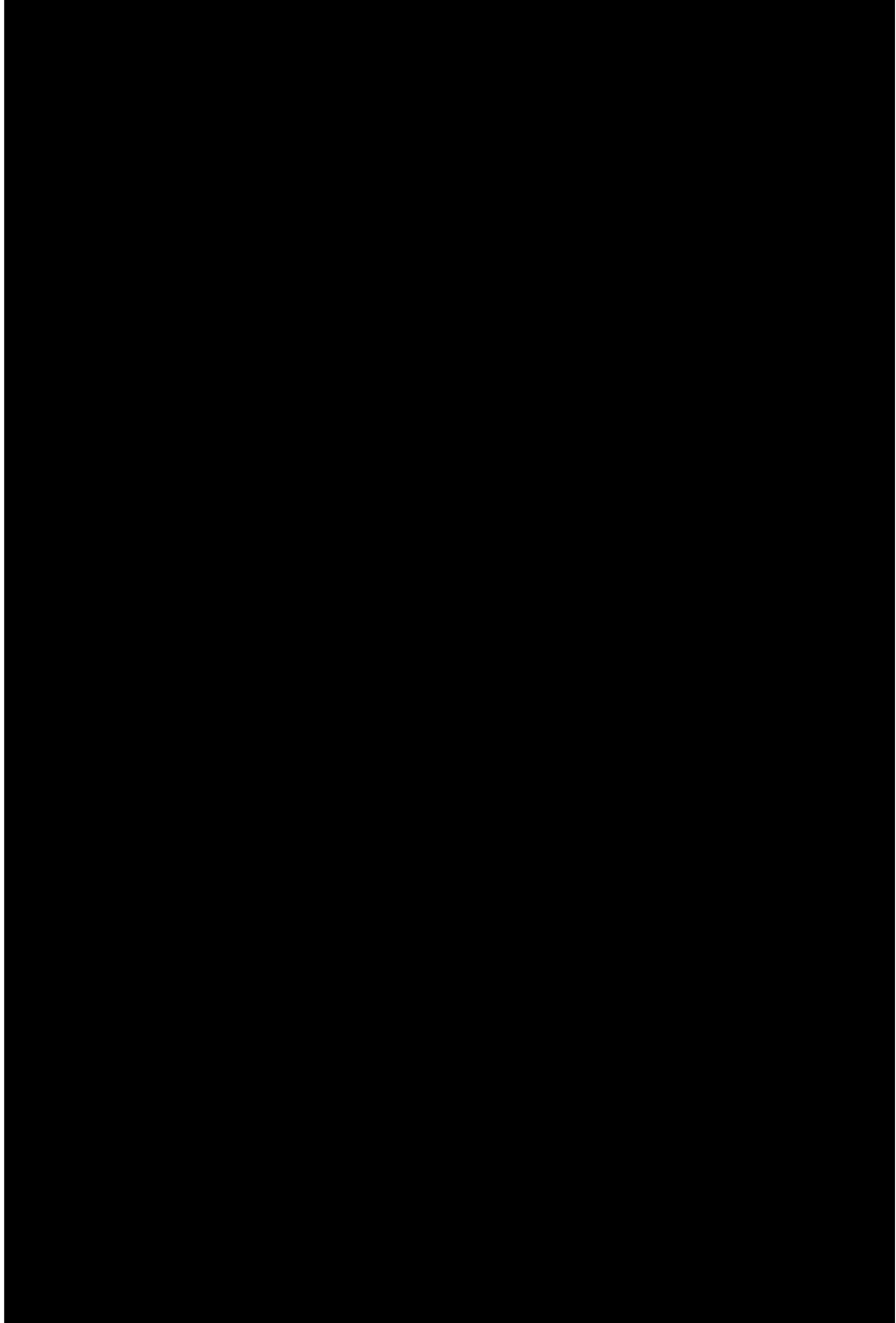

appropriate transmission path, which is perhaps selected to be the shortest source to destination distance. This is because, the microprocessor 17 has a memory function and it temporarily stores the information as to which one of the input channels has received the call packet in the first place. Thereafter, when one of the other input channels has received the call-back packet, then the microprocessor 17 causes the output channel corresponding to the stored input channel to be activated thereby allowing the call-back packet to be output therethrough. In this manner, the call and call-back packets are transmitted in the first stage to select and establish a communication path.

Then, upon reception by the source terminal of the call-back packet which has been transmitted through a particular path, the source terminal transmits a data or message packet containing a desired information to be transmitted to the destination terminal through the thus established communication path. When the destination terminal has detected the end of transmission of the data packet, it transmits a data reception acknowledgment packet (or simply "ack packet") to be transmitted along the same path to the source terminal. Then, the communication may be terminated, or, if desired, the next following data packet may be transmitted upon receiving the ack packet.

Although the frame structure of each of the packets is shown in FIG. 7 for the purpose of illustration, the structure of a packet itself is not critical in the present invention as mentioned before. This is because, the node 8 of the network does not examine the contents of a packet and it is the terminal 3 that examines the contents of a packet in the present invention. Therefore, in accordance with the present invention, the contents of a packet may be changed appropriately depending upon the kind of a terminal used, and such changes in the contents of a packet will not affect the performance of the present communication system in any manner.

Briefly described the structure of each of the packets shown in FIG. 7, the call packet includes a synchronization (or simply "sync") code, a destination (or simply "dest") address, a source address and a call end code, and the latter two are included for the purpose of security. Similarly, the call-back packet includes a sync code, a dest address, a source address and a call-back end code, and the latter three are included for the purpose of security. The data packet includes a sync code, a destination address, a source address, a message or data, an error check and a data end code, and, among these, the second, third and last items are included for the purpose of security. It is not by all means necessary to provide the error check. The ack packet includes a sync code, a destination address, a source address and ack end packet, and the latter three are included for the purpose of security.

As also shown in FIG. 7, what is important as to the transmission and reception of these packets is the timing in transmitting or receiving each of these packets and the method of scanning the input channels when attention is focused on a particular node 8 in the present communication network. That is, the input channels $I_{11}$–$I_{18}$ are normally scanned in sequence under the control of the microprocessor 17, and as soon as one of the input channels receives a call packet, the microprocessor 17 terminates the scanning operation at once and stores the information as to which one of the input channels has received the call packet in the first place. The call packet thus received is then output through all of the output channels, or, alternatively, through all of the output channels excepting the output channel which corresponds to the input channel which has received the call packet and thus the information as to which is stored in the microprocessor 17. The scanning of the input channels takes place while the call packet passes through the node, and such a rest condition continues until a predetermined time period $t_{PE}$ has elapsed as from the time when the rear end of the call packet has left the node. The time $t_{PE}$ is determined, for example, such that when the call packet travelling through the longest transmission path selectable in a given communication network under given conditions comes to the node in question, the time $t_{PE}$ is long enough for the call packet to pass through the node. By providing such a rest time period, the node is prevented from detecting the tail end of the call packet which has been transmitted through a longer transmission path. Another object of providing the scanning rest period $t_{PE}$ is that the node cannot determine whether there is a series of zeroes in the packet or the packet has left already since the node does not examine the contents of a packet in the present system and thus it is so structured to determine that the reception of a packet has been completed when a series of zeroes has been detected over the time $t_{PE}$.

When the time $t_{PE}$ has elapsed, the microprocessor 17 resumes the scanning operation of the input channels. In this instance, either all of the input channels or all of the input channels excepting the one which is stored in the microprocessor 17 may be set in the scanning operation, as desired, to wait for the arrival of another input signal, or the call-back packet in this case. If the front end of the call-back packet has reached one of the input channels within a predetermined time period $t_{CE}$ which is counted from the point in time when the call packet has left the node, the scanning operation is terminated immediately and the input channel which received the call-back packet is locked; on the other hand, under the instructions from the microprocessor 17, the call-back packet is output through the output channel which corresponds to the input channel stored in the microprocessor 17. Thereafter, when the time $t_{PE}$ has elapsed, the microprocessor 17 causes only the stored input channel to be activated and erases its stored information; at the same time, the microprocessor 17 stores the information of the input channel which has received the call-back packet. On the other hand, in the node which has not received the call-back packet within the time t between $t_{PE}$ and $t_{CE}$, the input channel information which has been stored in the microprocessor 17 of that node is erased and the microprocessor 17 resumes to scan the input channels $I_{11}$–$I_{18}$ to set ready for receiving another input signal.

For those nodes which have received the call-back packet, the above-described operation follows in principle also for data and ack packets excepting the scanning operation of input channels since a particular input channel has now been set. It is to be noted that in the above description, input signals are individually named such as call and call-back packets for the purpose of illustration, but, as mentioned previously, since the structural aspect of a packet is not critical in the present invention, the naming or structure of a packet has nothing to do with the node 8 of the present network. In other words, in accordance with the present invention, a particular communication path is selectively set up in the network when packets pass through nodes in a predetermined timed sequence.

It should also be noted that the example shown in FIG. 7 is the case when the communication procedure is to be initiated by the source terminal, or the terminal from which a message or data is to be transmitted. Another example is the case in which the communication procedure is to be initiated by the destination terminal, or the terminal which receives a message or data. In the latter case, only two packets are commonly transmitted. When applied to the present network, the destination terminal first transmits a call packet, and in response thereto the source terminal transmits a data packet. In this case, however, the data packet is transmitted through the communication path which has been already selected. In such a mode of communication operation, since the destination terminal plays a major role, it is not necessary to use call-back and ack packets. Even if such a mode of operation is desired to be used in the present network, since the nodes of the present network have nothing to do with the structure or number of packets used, there is no need to change the overall network structure and the structure and function of the node.

Figure 6:
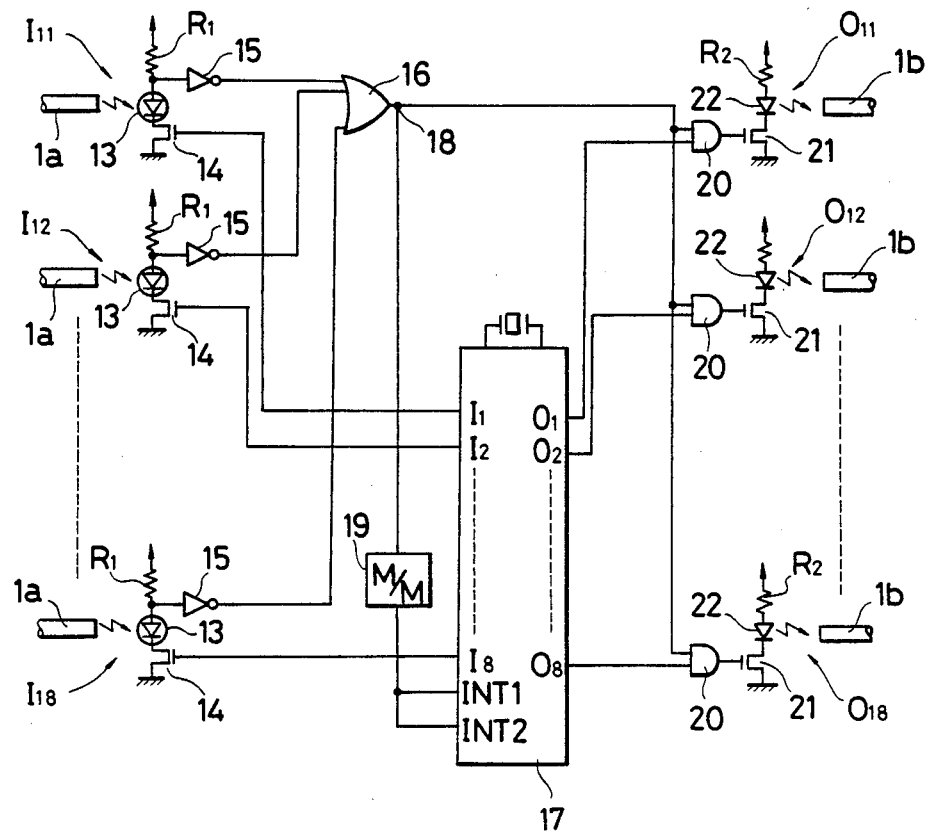
FIG. 6 is a circuit diagram partly in blocks and partly in logic symbols showing one example of the electrical structure of the node shown in FIG. 5.

Now, referring particularly to FIGS. 8a–8e, the operation of data communication, in particular space sharing data communication, of one embodiment of the present network using the node 8 having the structure shown in FIG. 6 and a set of packets shown in FIG. 7 will be described in detail hereinbelow.

The communication network schematically shown in FIGS. 8a–8e has six node $N_1$–$N_6$ and five terminals T each of which is connected to the corresponding one of the nodes $N_1$, $N_3$, $N_5$ and $N_6$. The rotating arrow shown in each of the circles representing nodes indicates the scanning direction of input channels. It is to be noted, however, that it is not critical for the present invention whether the scanning direction is clockwise or counterclockwise and whether the scanning direction is fixed in a predetermined direction or not. In some applications, it is preferable that the scanning of input channels is carried out rather at random in direction and manner. In each node $N_i$ (i=1–6), the input and output channels are indicated by $I_{ij}$ and $O_{ij}$, respectively. Moreover, the travelling path of a packet is indicated by the dotted lines. It is assumed that the first data communication is to be carried out between the terminals $T_{11}$ and $T_{31}$ with the terminal $T_{11}$ as the source terminal and the terminal $T_{31}$ as the destination terminal, and with a short time delay the second data communication is to be carried out between the terminals $T_{51}$ and $T_{61}$ with the terminal $T_{51}$ as the source terminal and the terminal $T_{61}$ as the destination terminal while the first data communication is in progress.

Initially, each of the terminals and thus its interface circuit is in a stand-by or receiving condition. When the source terminal $T_{11}$ transmits the call packet having the address information of the destination terminal $T_{31}$, the network is flooded by this packet as shown by the dotted lines in FIG. 8a. In transmitting the call packet from the source terminal $T_{11}$, it may be so structured that the terminal $T_{11}$ transmits the call packet as long as the time $t_{CE}$ has elapsed without reception of an input signal at the terminal $T_{11}$ by regarding that the network is not busy even if the network is, in fact, busy.

Figure 8A:
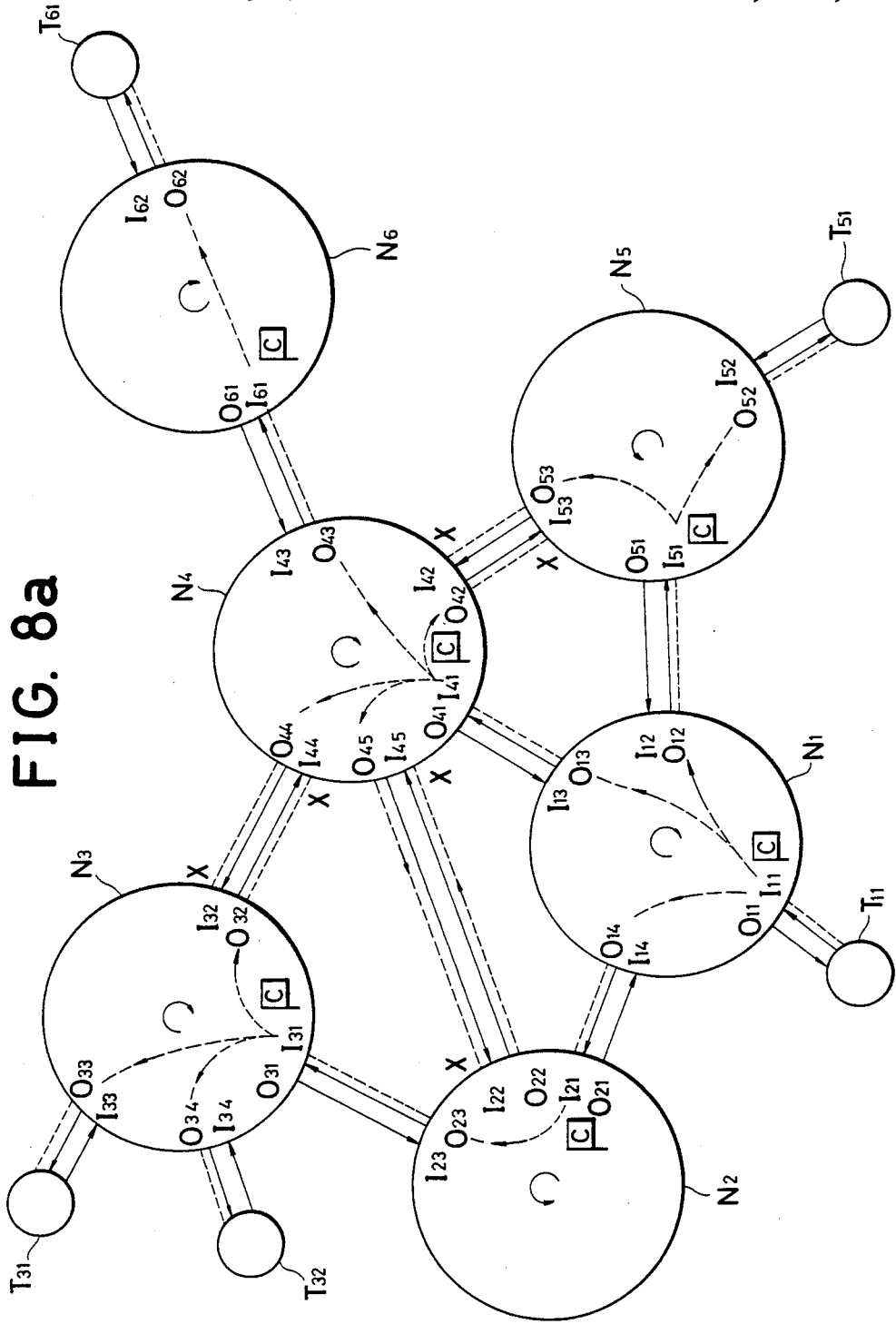
FIGS. 8a–8e are schematic illustrations useful for understanding the operation of the communication network including the nodes having the structure shown in FIG. 6 with the use of a set of packet signals shown in FIG. 7.

In the node $N_1$, the input channels $I_{11}$–$I_{14}$ are continuously scanned in the direction indicated by the rotating arrow, and when the input channel $I_{11}$ receives the call packet from the source terminal $T_{11}$, a flag is raised at the input channel $I_{11}$ and at the same time the call packet is output through the output channels $O_{12}$–$O_{14}$. The call packet may also be output through the output channel $O_{11}$ corresponding to the input channel $I_{11}$ which received the call packet, if desired. It is to be noted that what is meant by saying that a flag is raised at the input channel $I_{11}$ is that the microprocessor 17 of the node $N_1$ stores the information of the input channel $I_{11}$ as the channel which has received the call packet. The call packet is supplied through the output channels $O_{12}$, $O_{13}$ and $O_{14}$ to the nodes $N_5$, $N_4$ and $N_2$, respectively, and thus a flag is raised at each of the input channels $I_{51}$, $I_{14}$ and $I_{21}$, as shown in FIG. 8a. Importantly, when a flag is raised at one of the input channels of a node, the scanning of input channels is terminated thereby inhibiting to receive an input signal. Therefore, the call packet supplied to the input channel $I_{21}$ of the node $N_2$ is output through the output channels $O_{22}$ and $O_{23}$; however, the call packet directed to the input channel $I_{45}$ of the node $N_4$ through the output channel $O_{22}$ is rejected and thus not received by the node $N_4$. This is because, the input channel $I_{41}$ of the node $N_4$ has already received the call packet supplied through the output channel $O_{13}$ of the node $N_1$ and a flag has been raised at the input channel $I_{41}$ thereby inhibiting the input channel scanning operation. As described above, pursuant to the first-come-first-served logic, a flag is raised in each of the nodes only at the input channel which has received the call packet in the first place, so that all of the belated call packets directed to the other inputs are rejected. In FIG. 8a, the "x" sign is shown at the input channel which rejects the belated call packet.

Figure 8B:
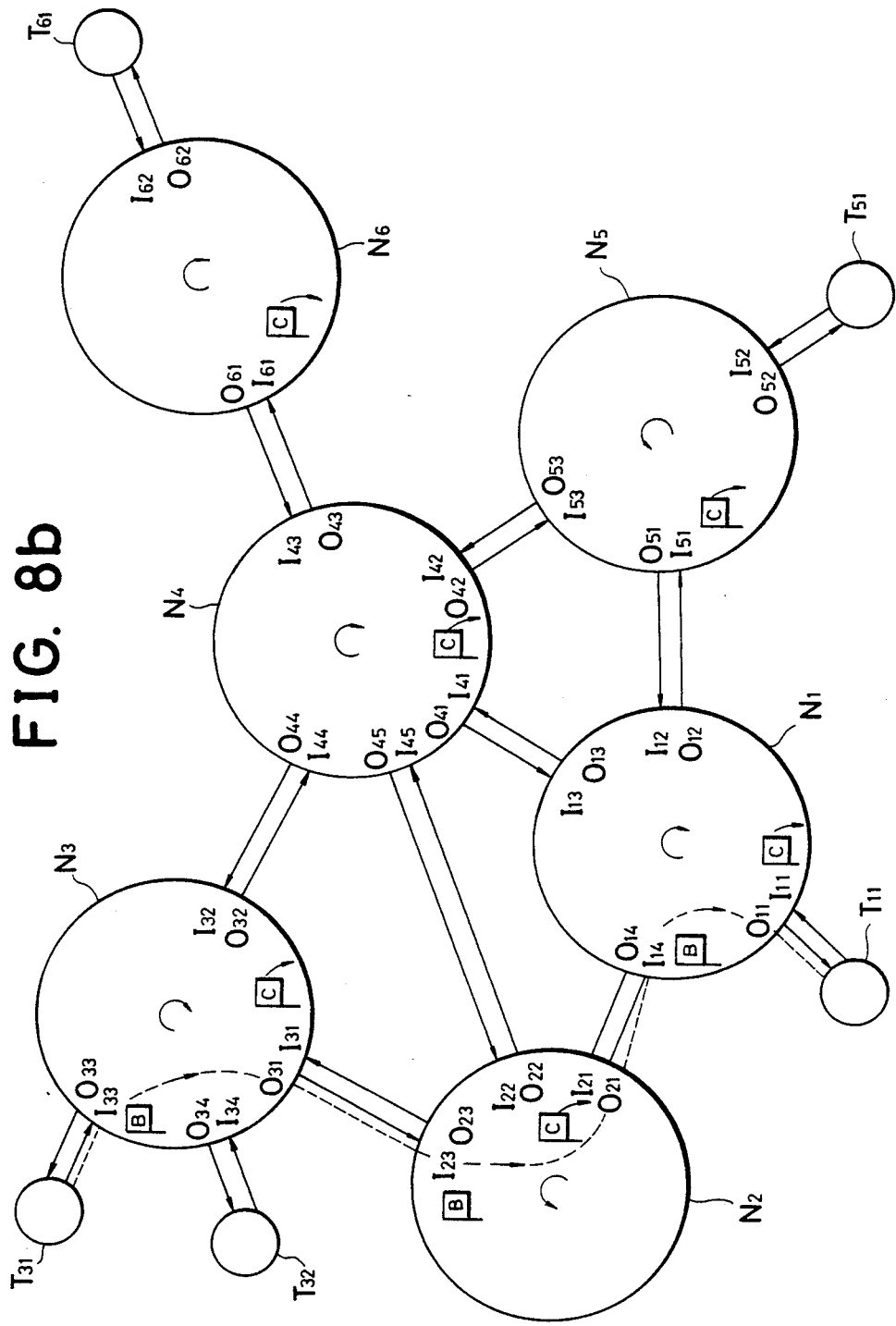

Although all of the terminals receive the call packet, which has been transmitted from the source terminal $T_{11}$ and has the address information of the destination terminal $T_{31}$, as shown in FIG. 8a, only the destination terminal $T_{31}$ responds to this call packet and transmits the call-back packet as a reply, as shown in FIG. 8b. In this instance, the timing of transmitting the call-back packet by the destination terminal $T_{31}$ is such that it is after elapsing time $t_{PE}$ and before elapsing time $t_{CE} - t_1$. Here, $t_1$ is the delay constant of the communication network. Putting it another way, it must be so set in a given network that each of the nodes located in a selected communication path connecting between the source and destination terminals $T_{11}$ and $T_{31}$ receives the front end of the call-back packet within the time period of $t_{PE} < t < t_{CE}$.

When the call-back packet transmitted from the destination terminal $T_{31}$ is received by the input channel $I_{33}$ of the node $N_3$ with appropriate timing, since time $t_{PE}$ has elapsed already at this time, the scanning of input channels has already been resumed at each node, and, thus, a flag is raised at the input channel $I_{33}$; at the same time, the flag at the input channel $I_{31}$ is lowered and the call-back packet is output only through the output channel $O_{31}$ which forms a pair with the input channel $I_{31}$. Then, similarly, the call-back packet is transmitted through the nodes $N_2$ and $N_1$. At the node $N_2$, a flag is raised at the input channel $I_{23}$; on the other hand, the flag is lowered at the input channel $I_{21}$. At the node $N_1$, a flag is raised at the input channel $I_{14}$ and the flag of the input channel $I_{11}$ is lowered. Finally, the call-back packet reaches the source terminal $T_{11}$ thereby establishing a communication path between the terminals $T_{11}$ and $T_{31}$ through the nodes $N_1$–$N_2$–$N_3$. On the other hand, after elapsing of time $t_{PE}$, the scanning of input channels is resumed also at the other nodes $N_4$–$N_6$, since the call-back packet is not transmitted to these nodes N4–N6, the flags are lowered in these nodes after elapsing of time $t_{CE}$ and thus these nodes are returned to the initial condition.

Figure 8C:
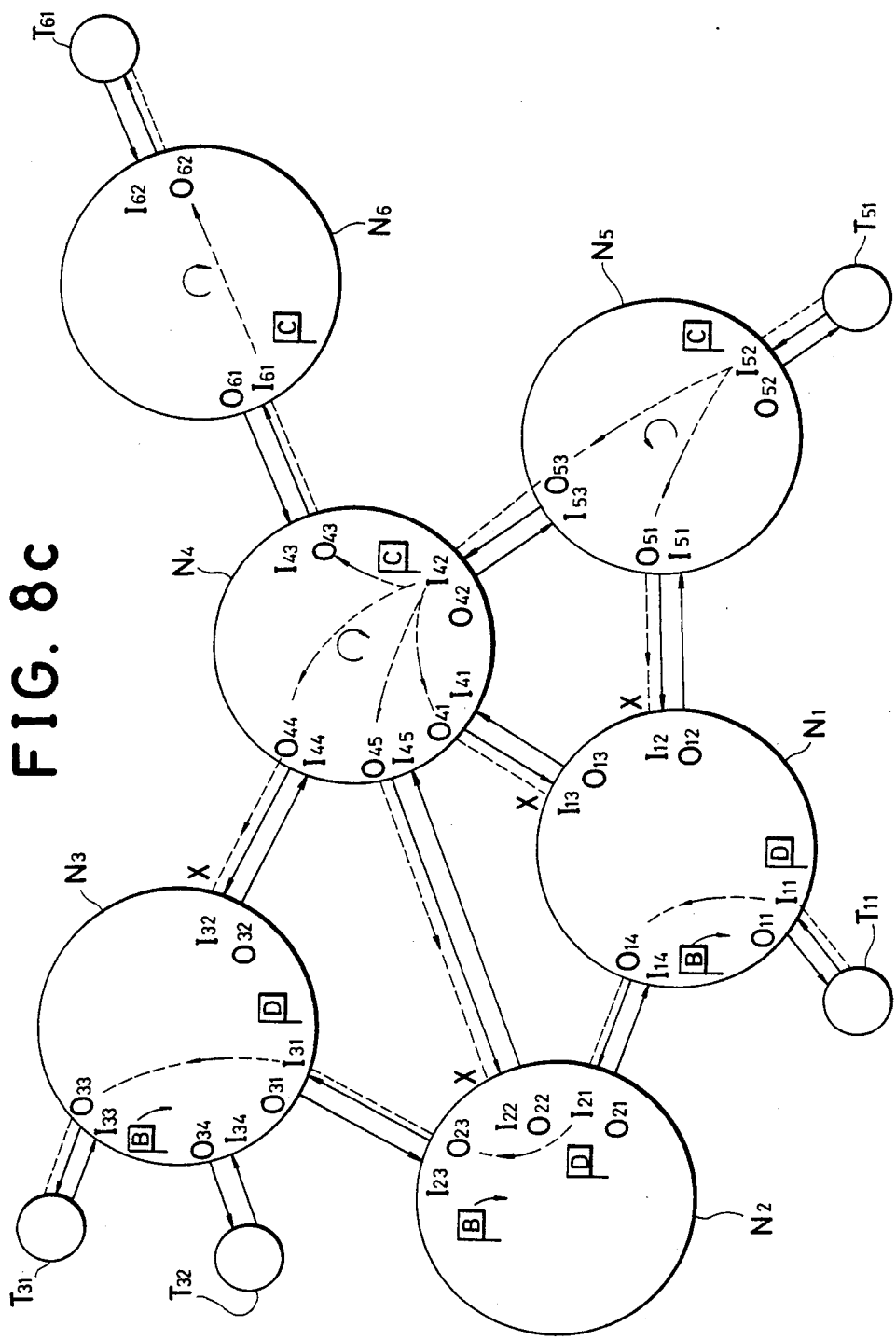

After receiving the call-back packet, the source terminal $T_{11}$ transmits the data packet with the timing after elapsing time $t_{PE}$ and before elapsing time $t_{CE}$-$t_1$, and the data packet travels along the selected communication path including the nodes $N_1$–$N_2$–$N_3$ and reaches the destination terminal $T_{31}$, as shown in FIG. 8c. Similarly with the operation described referring to FIG. 8b, in each node, a flag is raised at the input channel where the data packet is received and the data packet is output only through the output channel for whose paired input channel a flag has been up due to reception of the call-back packet, whereby the flag for reception of the call-back packet is lowered when the data packet is output.

At this juncture, it is assumed that the second data communication to be carried out between the terminal $T_{51}$ as the source terminal and the terminal $T_{61}$ as the destination terminal is initiated. The source terminal $T_{51}$ supplies the call packet having the address information of the destination terminal $T_{61}$ to the input channel $I_{52}$ of the node $N_5$, and, thus, a flag is raised at the input channel $I_{52}$ while the call packet is transmitted to the nodes $N_1$ and $N_4$ through the output channels $O_{51}$ and $O_{53}$, respectively. However, since the node $N_1$ is already in use, the call packet directed to the input channel $I_{12}$ of the node $N_1$ from the node $N_5$ is rejected. On the other hand, the call packet supplied to the node $N_4$ from the node $N_5$ is then sent towards the nodes $N_2$, $N_3$ and $N_6$, and it is rejected by the nodes $N_2$ and $N_3$, but passed through the node $N_6$ to reach the destination terminal $T_{61}$, as shown in FIG. 8c. Thus, the destination terminal $T_{61}$ transmits in reply the call-back packet directed to the source terminal $T_{51}$ with appropriate timing thereby establishing the communication path for carrying out the second data communication. This situation is illustrated in FIG. 8d.

Figure 8D:
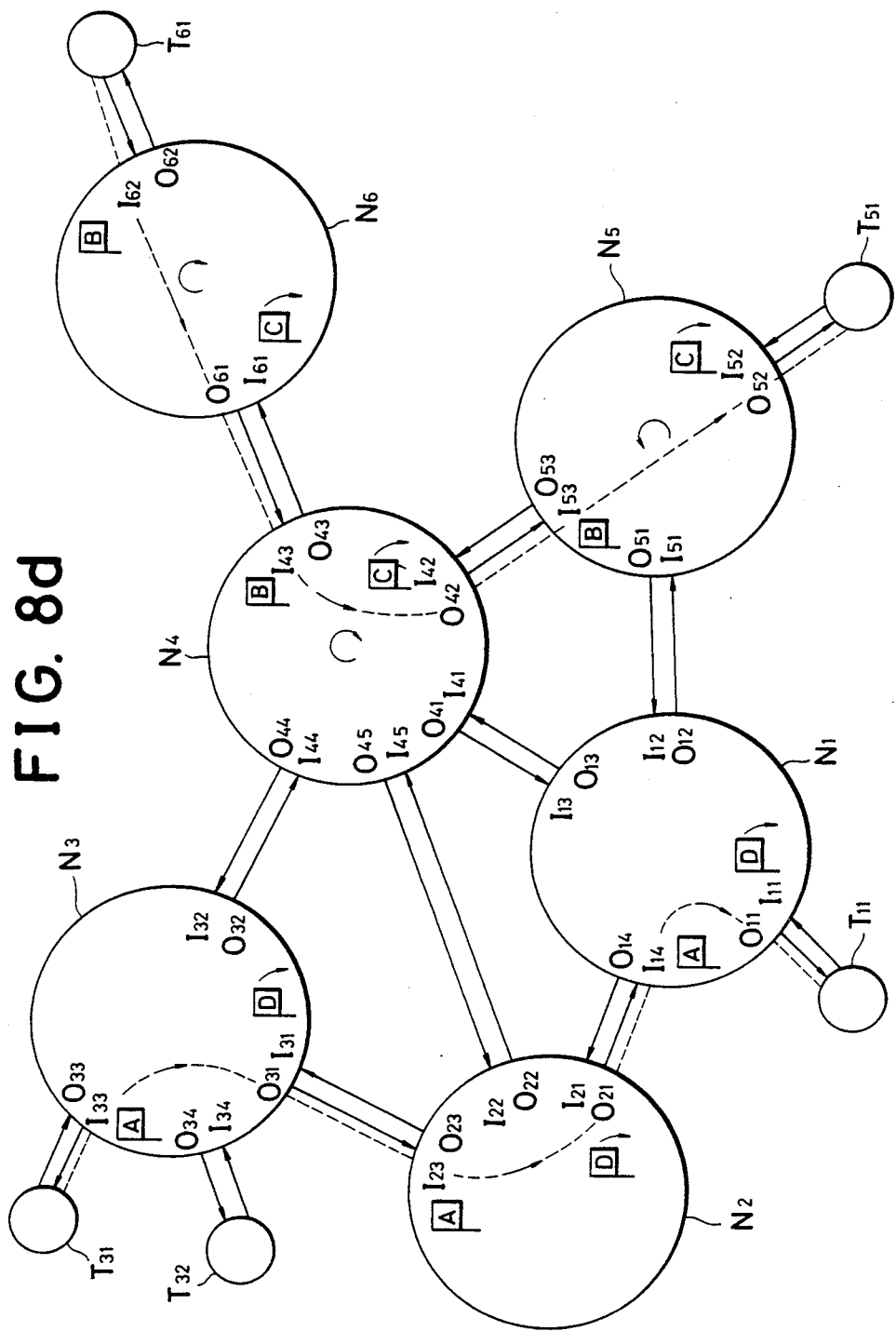

As shown in FIG. 8d, as regards the first data communication between the terminals $T_{11}$ and $T_{31}$, when the destination terminal $T_{31}$ detects the completion of reception of the data packet, it transmits an ack packet with appropriate timing. If desired, upon completion of reception of the data packet, it may be checked whether or not any error is present in the data received using the error check code. In such a case, it may be so structured that if an error in the transmitted data is found, the destination terminal sends a request signal to request the source terminal to retransmit the data packet. In this manner, when the source terminal $T_{11}$ has received the ack packet within a predetermined time period, it is so judged that the desired data information has reached the destination terminal $T_{31}$ correctly.

Figure 8E:
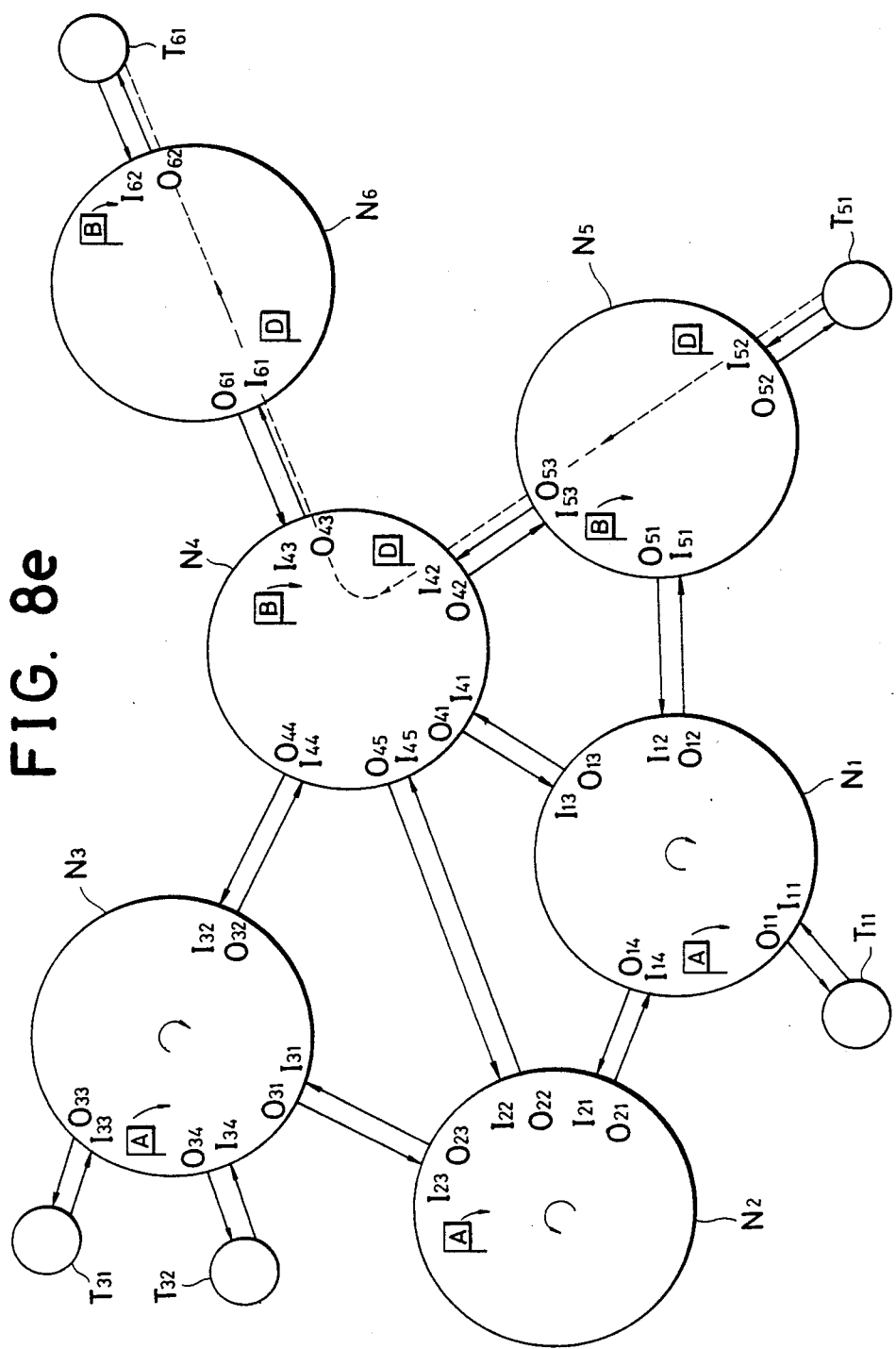

If any further signal has not been received within time period $t_{CE}$ as from the completion of reception of the ack packet, the communication operation ceases and all of the flags which are up in the nodes $N_1$–$N_3$ are lowered thereby reverting to the original condition. This situation is shown in FIG. 8e. It goes without saying that the similar operation follows for the second communication between the terminals $T_{51}$ and $T_{61}$.

In FIG. 8a, even if the node $N_2$ is out of order, the communication between the terminals $T_{11}$ and $T_{31}$ may be carried out through another route defined by the nodes $N_1$–$N_4$–$N_3$, and, therefore, reliability of the present communication network is extremely high. In this case, it is true that the second communication between the terminals $T_{51}$ and $T_{61}$ cannot be carried out at the same time; however, it may be carried out in sequence when the first communication between the terminals $T_{11}$ and $T_{31}$ has been finished. Alternatively, by providing, for example, an additional node $N_7$ (not shown) connected between the nodes $N_5$ and $N_6$, failure of the node $N_2$ does not affect the simultaneous communication between the terminals $T_{11}$ and $T_{31}$ and the terminals $T_{51}$ and $T_{61}$. In this manner, in accordance with the present invention, an expansion of the network allows to increase reliability as well as use rate. As may have already been appreciated, the present network can be expanded with ease.

Although the above description relates to the mode of operation in which communication is carried out between a single source terminal and a single destination terminal, the present invention is not to be limited to such a mode and the present invention may also be used for the so-called broadcasting communication in which the identical data information is transmitted to a plurality of destination terminals at the same time.

As set forth above in detail, in accordance with the present invention, since a plurality of communication paths exist between arbitrarily selected two nodes, reliability in communication is high. And the occurrence of a failure to one or more of the nodes and/or the transmission lines would not result in the total failure of the network. Moreover, the present network may be constructed by applying any of the known connecting methods such as the linear and loop connections singularily or in combination, and it is adaptable for partial expansion or contraction. Since the nodes of the present network do not examine the contents of a packet used, there is a high degree of freedom in the structural aspect of a packet, and, at the same time, the possibility of affecting the data transmission rate due to the node structure is minimized. Furthermore, since the node used in the present network is very low in the degree of intelligence, it may be manufactured at a low cost, and the replacement of parts or modifications in upgrading the once established communication network is minimized. Besides, the present network is operable with any mode of communication operation such as simultaneous communication (space sharing communication) and broadcasting communication, and no special modifications to the network are required even if the mode of communication operation has been cnanged. Further, the node to node connection in the present network is rather linear in nature so that light transmitting mediums such as optical fibers may be easily used as the transmission lines thereby allowing to increase the data transmission rate to the order of 10–100 mega bps. In addition, since the node in the present network does not have its own address, there is a large degree of freedom in constructing the node to node connection and the node to terminal connection.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A communication network comprising:
   a first plurality of nodes, each of said nodes including at least two input channels, the same number of output channels each corresponding to one of said input channels, and connection control means for scanning said input channels for receipt of an input signal to the node and for controlling a connection condition between said input and output channels, wherein said connection control means stores information to flag which one of said input channels has received an input signal for a predetermined time period from reception of said input signal or until reception of another input signal by another of said input channels within said predetermined time period, and thereupon causes other input signal to be supplied to an output channel corresponding to said flagged one input channel;

at least one terminal connected to a selected node;

first transmission means connected between said plurality of nodes; and second transmission means connected between said at least one terminal and said selected node; wherein a first input channel of said at least two input channels and its corresponding first output channel of one of said plurality of nodes are connected through said first transmission means to a first output channel and its corresponding first input channel, respectively, of another of said plurality of nodes.

2. A network of claim 1 wherein when an input signal is input to any one of said input channels while said input channels are being scanned, said connection control means detects the front end of said input signal and supplies said input signal to selected at least one of said output channels.

3. A network of claim 2 wherein the connection control means of each of said nodes includes input switching means connected between each of said input channels and a common junction, output switching means connected between each of said output channels and said common junction and a controller capable of carrying out the on/off control of said input and output switching means.

4. A network of claim 3 wherein the connection between said input switching means and said common junction includes a multiple input OR circuit having each of its inputs connected to one of said input switching means and its output connected to said common junction.

5. A network of claim 4 wherein said controller includes a microprocessor having a first set of signal pins connected to said input switching means, a second set of signal pins connected to said output switching means and at least one interrupt pin connected to said common junction.

6. A network of claim 1 wherein said first transmission means includes a pair of light transmitting mediums, wherein an input channel is comprised of one of said pair of light transmitting mediums and a light receiving element for receiving light emitted therefrom, and a corresponding output channel is comprised of the other of said pair of light transmitting mediums and a light emitting element for emitting light therein.

7. A network of claim 6 wherein said pair of light transmitting mediums has a partial common portion thereby allowing bidirectional transmission of signals through said partial common portion.

8. A network of claim 3 wherein when an input signal is received by one of said at least two input channels, said connection control means cause the remaining input channels to be deactivated.

9. A network of claim 8 wherein the controller of said connection control means scans said plurality of input switching means thereby causing said input switching means activated one at a time in sequence and stops the scanning immediately upon reception of an input signal and locks the input channel which has received said input signal.

10. A network of claim 3 wherein said control connection means is capable of causing an output signal to be output through selected one or more of said output channels.

11. A network of claim 1 wherein said connection control means further controls the connection condition between input and output channels such that, if no input channel is flagged when an input signal is received by one input channel, said connection control means causes said input signal to be supplied as an output signal to all of said output channels, or to all of said output channels excepting one of said output channels corresponding to said one input channel which has received said input signal.

12. A network of claim 1 wherein a second input channel of said at least two input channels and its corresponding second output channel of one node is connected through said first transmission means to a first output channel and its corresponding fist input channel, respectively, of another node, or through said second transmission means to an output and input, respectively, of said at least one terminal.

13. A network of claim 12 wherein said first and second transmission means are identical in structure.

14. A network of claim 13 wherein each of said first and second transmission means includes a pair of light transmitting mediums.

15. A node for use in a communication network as connected to one or more other nodes and/or terminals of various peripheral devices, comprising:

a plurality of input channels;

a like plurality of output channels, each of which corresponds to one of said plurality of input channels thereby forming a like plurality of input-output channel pairs; and connection control means for scanning said input channels for receipt of an input signal and for controlling a connection ondition between said plurality of input and output channels, wherein said connection control means stores information to flag which one of said plurality of input channels has received an input signal, without inspecting the contents thereof, for a predetermined time period from reception of said input signal or until reception of another input signal by another of said input channels within said predetermined time period, and thereupon causes said other input signal to be supplied as an output signal to an output channel corresponding to said flagged one input channel.

16. A node of claim 15 wherein said connection control means further controls the connection condition between said plurality of input and output channels such that, if two or more input signals are input to two or more of said plurality of input channels substantially at the same time, said connection control means selects one of said two or more input signals as being valid in accordance with a predetermined manner.

17. A node of claim 16 wherein said plurality of input channels are scanned in a predetermined manner to be activated one at a time in sequence such that said connection control means selects one of said two or more input signals which have been input substantially at the same time.

18. A node of claim 16 wherein said connection control means still further controls the connection condition between said plurality of input and output channels such that, if said connection control means has stored no information flagging any of said plurality of input channels as having previously received an input signal, said connection control means causes an input signal received by one input channel to be supplied, without inspecting the contents thereof, as an output signal to each of said plurality of output channels, or to each of said plurality of output channels excepting one corresponding to said one input channel which has received said input signal.

19. A node of claim 18 wherein said connection control means still further controls the connection condition between said plurality of input and output channels such that said connection control means prevents the other input channels from receiving other input signals while said one of said plurality of input channels is receiving said input signal.

* * * * *